United States Patent
Masse et al.

(10) Patent No.: US 9,790,984 B2
(45) Date of Patent: Oct. 17, 2017

(54) SELF-LUBRICATING HINGE ASSEMBLY MADE FROM COMPOSITE MATERIAL AND OPERATING UNDER HIGH DYNAMIC LOADS

(71) Applicant: H.E.F., Andrezieux Boutheon (FR)

(72) Inventors: Emmanuel Masse, Feurs (FR); Olivier Blandenet, Meylan (FR); Philippe Maurin-Perrier, Saint Marcellin en Forez (FR)

(73) Assignee: H.E.F., Andrezieux Boutheon (FR)

( * ) Notice: Subject to any disclaimer, the term of this patent is extended or adjusted under 35 U.S.C. 154(b) by 196 days.

(21) Appl. No.: 14/436,617

(22) PCT Filed: Oct. 15, 2013

(86) PCT No.: PCT/FR2013/052458
§ 371 (c)(1),
(2) Date: Apr. 17, 2015

(87) PCT Pub. No.: WO2014/064366
PCT Pub. Date: May 1, 2014

(65) Prior Publication Data
US 2016/0169272 A1    Jun. 16, 2016

(30) Foreign Application Priority Data
Oct. 22, 2012 (FR) ..................... 12 60031

(51) Int. Cl.
*F16C 11/06* (2006.01)
*F16C 33/20* (2006.01)
*F16C 23/04* (2006.01)
*F16C 33/28* (2006.01)

(52) U.S. Cl.
CPC .......... *F16C 11/068* (2013.01); *F16C 23/045* (2013.01); *F16C 33/201* (2013.01);
(Continued)

(58) Field of Classification Search
CPC ...... F16C 33/122; F16C 33/205; F16C 33/16; F16C 33/203; F16C 11/068; F16C 23/045;
(Continued)

(56) References Cited

U.S. PATENT DOCUMENTS 2,835,539 A    5/1958  Winthrop
3,692,375 A *  9/1972  Matt ...................... B29C 53/60
                                                              138/144
(Continued)

FOREIGN PATENT DOCUMENTS

FR    2038659 A5    1/1971
FR    2117062 A5    7/1972
(Continued)

OTHER PUBLICATIONS

Polygon Design Guide, May 13, 2013, pp. 1-47, reference obtained via internet wayback machine website on Dec. 20, 2016, https://web.archive.org/web/20111017213948/http:/polygoncomposites.com/downloads/Files/POLYLUBE_design-guide.pdf, p. 21, May 3, 2013, https://web.archive.org/web/20130503134842/http://polygoncomposites.com/bearings-master/bear.*
(Continued)

*Primary Examiner* — Jonathan Masinick
(74) *Attorney, Agent, or Firm* — Heslin Rothenberg Farley & Mesiti, P.C.

(57) ABSTRACT

This assembly includes a ball joint assembled in a casing, and receiving an axle capable of sliding and/or rotating therein. The ball joint is formed from the winding of a fabric of small thickness ranging between 20 µm and 150 µm and mixed with a resin comprising fillers. The fabric has the form of strips having a width ranging between 5 mm and 200 mm; the strips being crossed in several layers.

7 Claims, 1 Drawing Sheet

(52) U.S. Cl.
CPC ............ *F16C 33/208* (2013.01); *F16C 33/28* (2013.01); *F16C 33/203* (2013.01); *F16C 2208/40* (2013.01); *F16C 2208/70* (2013.01); *F16C 2208/86* (2013.01); *F16C 2208/90* (2013.01); *F16C 2220/28* (2013.01); *F16C 2240/30* (2013.01); *F16C 2240/60* (2013.01)

(58) Field of Classification Search
CPC ........ F16C 17/10; F16C 17/35; F16C 17/024; Y10T 403/32622; Y10T 403/32631
USPC ............................................. 29/898; 384/298
See application file for complete search history.

(56) References Cited

U.S. PATENT DOCUMENTS

| | | | | |
|---|---|---|---|---|
| 4,137,618 A | * | 2/1979 | Krauss | ................ F16C 11/0633 156/245 |
| 5,431,500 A | | 7/1995 | Harris et al. | |
| 5,560,103 A | * | 10/1996 | Harris | ................... B29C 53/586 156/154 |
| 8,231,276 B2 | * | 7/2012 | Than Trong | .......... F16C 33/201 29/898.041 |
| 2004/0074592 A1 | * | 4/2004 | Ashton | ............... B29C 37/0064 156/175 |

FOREIGN PATENT DOCUMENTS

| | | | | |
|---|---|---|---|---|
| WO | 2004/079217 | * | 9/2004 | .............. F16C 33/20 |
| WO | WO 2004079217 A1 | * | 9/2004 | ........... F16C 33/201 |
| WO | 2006037083 A2 | | 4/2006 | |

OTHER PUBLICATIONS

International Search Report for PCT/FR2013/052458 dated Dec. 5, 2013.

* cited by examiner

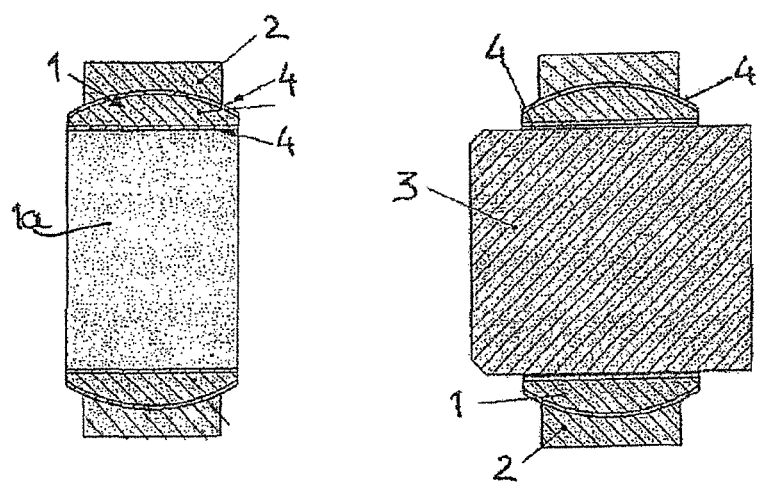

SELF-LUBRICATING HINGE ASSEMBLY MADE FROM COMPOSITE MATERIAL AND OPERATING UNDER HIGH DYNAMIC LOADS

CROSS REFERENCE TO RELATED APPLICATIONS

This application is the U.S. National Filing of PCT Application No. PCT/FR2013/052458 filed on Oct. 15, 2013 and published in French as WO 2014/064366 A1 on May 1, 2014, and claims priority of French patent application number 1260031 filed on Oct. 22, 2012, the entire disclosure of these applications being hereby incorporated herein by reference.

BACKGROUND ART

The invention relates to the technical field of self-lubricating joints, especially for the assembly of an axle in a ball joint or bearing allowing a rectilinear or rotational guiding.

The invention advantageously applies for all types of joints requiring a greaseless operation, that is, with a self-lubricating operation and operating under high loads in dynamic state.

The invention aims at obtaining a self-lubricating joint made of polymer which is homogeneous across its entire thickness with no reinforcement substrate and operating under high loads, for example, greater than 60 MPa in dynamic state.

According to the state of the art, this type of composite polymer joint is not fully satisfactory because of its poor behavior under mechanical loading and to its risks of flow and delamination under a dynamic load, including for loads lower than 60 MPa. For example, self-lubricating ball joints formed of a cage made of composite polymer or having a composite friction coating and of a chromium or stainless steel sphere are known. However, seizing problems appear between the sphere and the axle. Ball joints entirely made of polymers but having no resistance to dynamic loads greater than 40 MPa are also known.

The invention aims at overcoming these disadvantages in a simple, reliable, efficient, and rational way.

The problem that the present invention aims at solving is to self-lubricate the two contacts of a ball joint, that is, between the sphere and the cage on the one hand, and between the sphere and the axle on the other hand, with the aim of obtaining an easy disassembly of the sphere/axle contact, the considered joint being adapted for strong contact pressures greater than 40 MPa.

BRIEF SUMMARY OF THE INVENTION

According to the invention, the ball joint is formed from the winding of a fabric of small thickness ranging between 20 μm and 150 μm and preferably between 20 μm and 130 μm and mixed with a resin comprising fillers, said fabric appearing in the form of strips having a width ranging between 5 mm and 200 mm, said strips being crossed in several layers, according to the filament winding technique.

Such features provide a better homogeneity with the use of thinner strips and a better resistance to tangential frictional stress due to the crossing of the layers of fabric forming the material.

This also results in a better dynamic load behavior due to the crossing of the strips and a better static load behavior due to a better homogeneity of the material.

Advantageously, the crossing angle ranges between 10° and 90°, and preferably between 30° and 86°.

According to other features, the resin is of epoxy, ester vinyl, polyester, phenolic, polyimide, or other type while the fillers are of PTFE, MoS2, or graphite type.

It should be noted that the fillers amount to between 5 and 70% of the volume.

According to another feature, the bore of the ring and its periphery have a self-lubricating coating.

BRIEF DESCRIPTION OF THE DRAWING FIGURES

The invention is discussed hereafter in further detail by means of the accompanying drawings, among which:

FIG. 1 is a longitudinal cross-section view of the joint assembly formed by a self-lubrication sphere or ball joint engaged in a self-lubricating cage and made of fabric deposited by crossing according to the features of the invention to obtain a better homogeneity.

FIG. 2 is a view corresponding to FIG. 1 after an axle has been installed in the ball joint bore.

DETAILED DESCRIPTION

As indicated, FIG. 1 shows a self-lubricating ball joint or joint sphere (1) engaged in a cage (2) or casing. The bore (1a) of the ball joint (1) is intended to receive an axle (3) able to rotatably slide therein.

The bore of the ball joint and its periphery are coated with a self-lubricating material (4). The desired aim is to avoid any seizing effect.

According to the invention, the self-lubricating ball joint (1) is made from the winding of a synthetic fabric of small thickness ranging between 20 μm and 150 μm and advantageously between 20 μm and 130 μm.

The fabric, which appears in the form of strips, is mixed with a resin of epoxy, ester vinyl, polyester, phenolic, polyimide, or other type.

The resin comprises fillers of PTFE, MoS2, graphite or other type by on the order of from 5 to 70% of the volume.

The aim is to obtain a product which is homogeneous across its entire thickness.

The fabric strips have a width ranging between 5 mm and 200 mm and are wound on a mandrel of determined diameter, according to the filament winding technique.

The strips are wound and crossed in several layers, the crossing angle ranging between 10° and 90° and advantageously between 30° and 86°. For example, the winding appears in the form of 9 plies of 100 μm as opposed to a winding according to the state of the art in the form of 3 plies of 300 μm.

It should be noted that the fabric intended to be mixed with the resin may be made of taffeta, satin, twill or a cloth without excluding other fiber textures.

Reference should be made to the following tests in the case of a joint in the form of a self-lubricating composite ball joint, according to the features of the invention and according to the state of the art (bearing E1 and bearing E2).

Protocol
Nature of the axle: 16 NC 6 CT Ra: 0.4
Bearing nature:
Type of bearing: Ball joint Ø35×Ø55×25
Motion: Alternated rotation over 90°
Pressure calculated in projected area: 40 MPa
Sliding speed: 6 mm/s
Criterion for Stopping the Test Friction coefficient >0.25
Wear >0.5 mm
Number of cycles reached: 365,000 cycles

| Test results | |
| --- | --- |
| Bearing according to the invention: | Crossed winding<br>Width of the fabric strip: 30 mm,<br>thickness 0.10 mm<br>Wear = 0.35 mm<br>F < 0.1<br>Number of cycles: 365,000 cycles |
| Bearing E1: | Winding at 90°<br>Width of the fabric strip: 1,200 mm<br>thickness 0.30 mm<br>Wear = 0.5 mm<br>F < 0.2<br>Number of cycles: 2,500 cycles |
| Bearing E2: | Winding at 90°<br>Width of the fabric strip: 1,200 mm<br>thickness 0.30 mm<br>Wear > 0.5 mm<br>F < 0.25<br>Number of cycles: 3,000 cycles |

The advantages well appear from the description, and the following should in particular be underlined and reminded:
  a better dynamic load behavior due to the crossing of the fabrics,
  a better static load behavior due to a better homogeneity of the material,
  the impossibility of a seizing between the ball joint and the axle.

The invention claimed is:

1. A self-lubricating joint assembly operating under high loads in dynamic state and comprising a ball joint assembled in a casing, said ball joint receiving an axle capable of sliding and/or rotating in the ball joint, wherein the ball joint includes a core comprising a winding of a fabric of thickness ranging between 20 µm and 150 µm mixed with a resin comprising fillers, said fabric having the form of strips having a width ranging between 5 mm and 200 mm, said strips being crossed at a crossing angle ranging between 10° and 90° in several layers by filament winding, and wherein both an inner periphery and an outer periphery of the core are coated with a self-lubricating material.

2. The assembly of claim 1, wherein the fabric thickness ranges between 20 µm and 130 µm.

3. The assembly of claim 1, wherein a crossing angle of the crossing strips ranges between 30° and 86°.

4. The assembly of claim 1, wherein the fabric comprises synthetic fabric.

5. The assembly of claim 1, wherein the resin comprises epoxy, ester vinyl, polyester, phenolic, or polyimide.

6. The assembly of claim 1, wherein the fillers comprise PTFE, MoS2, or graphite.

7. The assembly of claim 6, wherein the fillers amount to between 5 and 70% of the volume.

* * * * *